(12) United States Patent
Xin

(10) Patent No.: US 9,141,850 B2
(45) Date of Patent: Sep. 22, 2015

(54) ELECTRONIC DEVICE AND PHOTO MANAGEMENT METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yang Xin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 47 days.

(21) Appl. No.: 13/893,334

(22) Filed: May 13, 2013

(65) Prior Publication Data

US 2013/0300896 A1 Nov. 14, 2013

(30) Foreign Application Priority Data

May 14, 2012 (CN) .......................... 2012 1 0147497

(51) Int. Cl.
*G06K 9/00* (2006.01)
*G06F 17/30* (2006.01)

(52) U.S. Cl.
CPC ...... *G06K 9/00288* (2013.01); *G06F 17/30256* (2013.01)

(58) Field of Classification Search
CPC .............. H04N 5/772; H04N 2101/00; H04N 1/32128; G06K 9/00275; G06K 9/00288; G06K 9/00302; G06F 17/30256
See application file for complete search history.

(56) References Cited

U.S. PATENT DOCUMENTS

| | | | | |
|---|---|---|---|---|
| 7,724,296 | B2 * | 5/2010 | Lonn | 348/333.12 |
| 8,760,551 | B2 * | 6/2014 | Haikin et al. | 348/333.02 |
| 2007/0024722 | A1 * | 2/2007 | Eura et al. | 348/231.2 |
| 2008/0080846 | A1 * | 4/2008 | Grip | 396/51 |
| 2008/0084482 | A1 * | 4/2008 | Hansson et al. | 348/218.1 |
| 2012/0081392 | A1 * | 4/2012 | Arthur | 345/633 |
| 2012/0120186 | A1 * | 5/2012 | Diaz et al. | 348/36 |
| 2012/0224077 | A1 * | 9/2012 | Imai et al. | 348/222.1 |

* cited by examiner

*Primary Examiner* — Luong T Nguyen
(74) *Attorney, Agent, or Firm* — Novak Druce Connolly Bove + Quigg LLP

(57) ABSTRACT

A photo management method implemented by an electronic device having a first camera and a second camera includes capturing a first photo by the first camera and capturing a simultaneous second photo by the second camera of the face of a user. Facial characteristics are extracted from the second photo and the characteristics are added to attribute information of the first photo. When the user wants to browse photos showing or including himself/herself, a third photo of the user is captured and facial characteristics extracted. One or more first photos are determined according to the facial characteristics of the third photo, and the one or more first photos showing or including the user are collected in one group and displayed.

18 Claims, 5 Drawing Sheets

ELECTRONIC DEVICE AND PHOTO MANAGEMENT METHOD THEREOF

BACKGROUND

1. Technical Field

The present disclosure relates to photo processing technologies, and more particularly to a photo management method and an electronic device having a photo management function.

2. Description of Related Art

Many electronic devices, such as mobile phones, are used to take photos. The electronic device may be used by different users besides the owner of the electronic device. When a target user wants to find out the photos taken by himself/herself, he/she may need to peruse all of the photos stored in the electronic device. This is time consuming and inconvenient. Therefore, there is room for improvement in the art.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
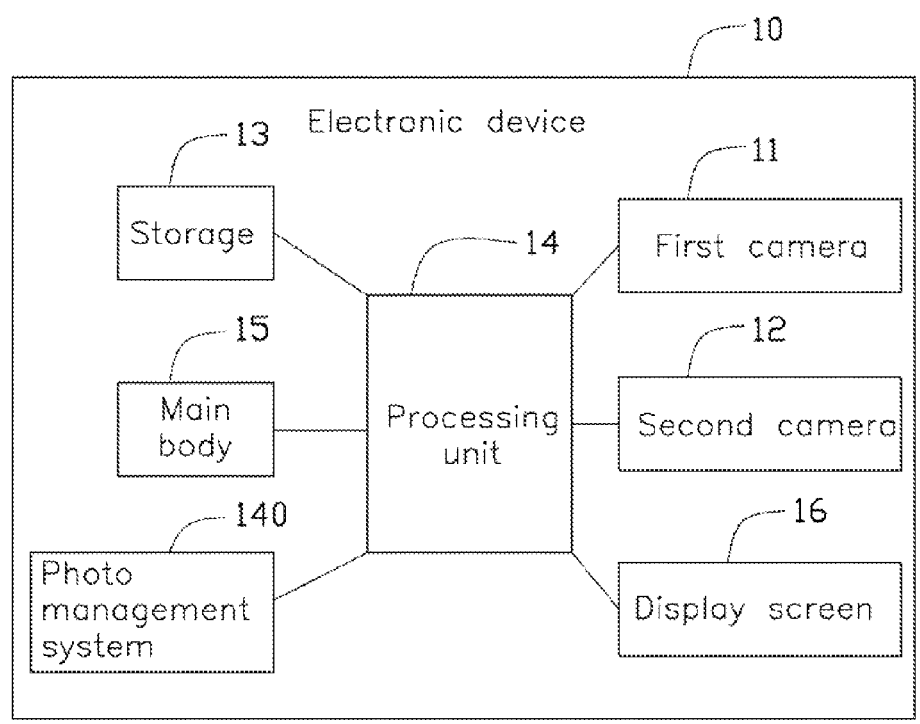
FIG. 1 is a schematic block diagram of an electronic device according to an exemplary embodiment of the present disclosure.

FIG. 1 is a schematic block diagram of an electronic device 10 according to an exemplary embodiment of the present disclosure. The electronic device 10 includes a first camera 11, a second camera 12, a storage 13, a processing unit 14, a photo management system 140, a main body 15, and a display screen 16. In one embodiment, the electronic device 10 may be, for example, a smart phone, a portable computer, or other similar device having the first camera 11 and the second camera 12. FIG. 1 shows one example of the electronic device 10, and the electronic device 10 can include more or fewer components than those shown in the embodiment, or have a different configuration of the components.

The main body 15 accommodates the first camera 11, the second camera 12, the storage 13, and the processing unit 14. The first camera 11 and the second camera 12 are located at opposite sides of the main body 15. For example, the first camera 11 may be a rear camera located at the rear side of the main body 15, and the second camera 12 may be a front camera located at the front side of the main body 15. The first camera 11 captures photos of objects at a first side of the electronic device 10 to obtain first photos. The first photos may be obtained by capturing the objects, take trees, flowers, buildings, for example. Each of the first photos includes different attribute information, for example, device information (e.g., device name, device identification) of the electronic device 10, time information when each photo is captured, and size of each photo. The second camera 12 captures images of objects at the second side opposite to the first side of the electronic device 10 to obtain second photos. In the embodiment, the second camera 12 is the front camera facing a user configured for capturing photos of a user to obtain facial characteristics of the user.

Figure 2:
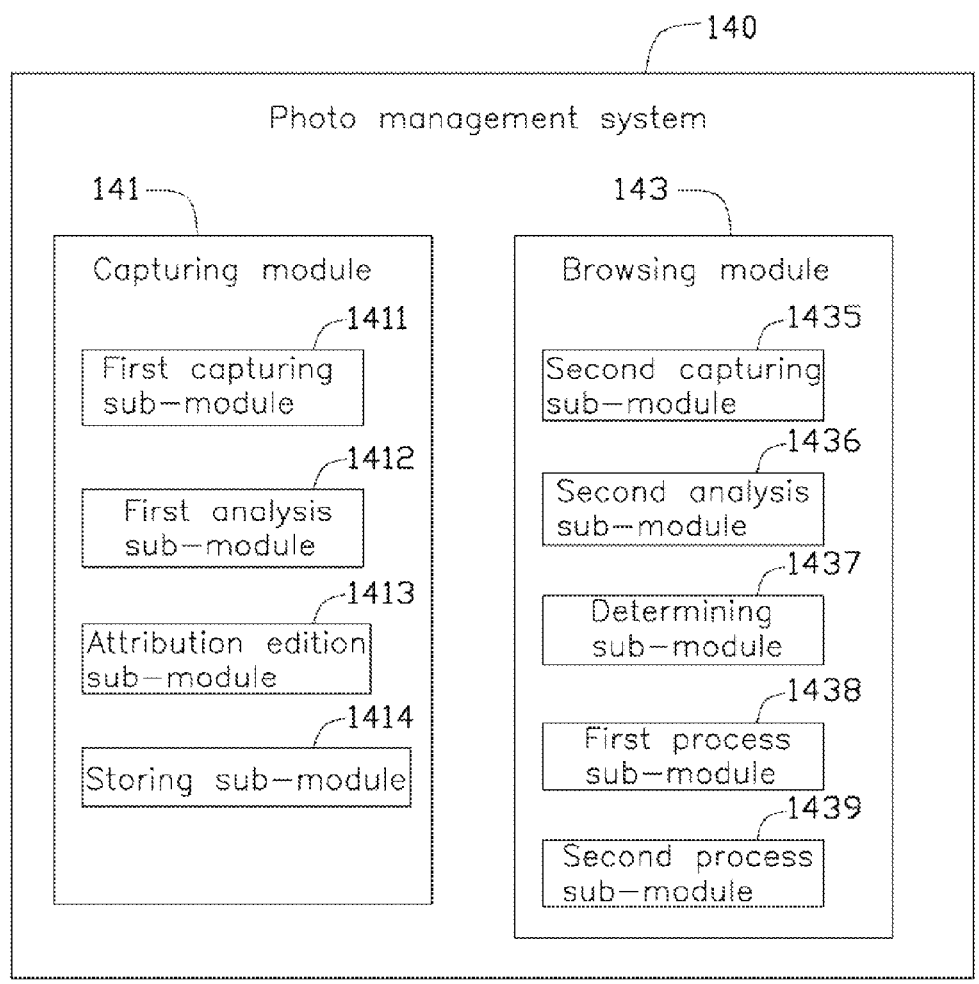
FIG. 2 is a schematic block diagram of one embodiment of a processor of the electronic device of FIG. 1.

The photo management system 140 may include a plurality of software programs in the form of one or more computerized instructions stored in the storage 13 (or in the processing unit 14) and executed by the processing unit 14 to perform operations of the first camera 11 and the second camera 12. The software programs of the photo management system 140 may be embedded in a device driver of the electronic device 10. In one embodiment, as shown in FIG. 2 the photo management system 140 includes a capturing module 141 and a browsing module 143. The capturing module 141 includes a first capturing sub-module 1411, a first analysis sub-module 1412, an attribution edition sub-module 1413, and a storing sub-module 1414. The browsing module 143 includes a second capturing sub-module 1435, a second analysis sub-module 1436, a determining sub-module 1437, a first process sub-module 1438 and a second process sub-module 1439. In general, the word "module" as used in here, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The photo capturing module 141 captures photos using the first camera 11 and the second camera 12 and stores the captured photos. Details of the photo capturing module 141 are included in the following descriptions of the sub-modules 1411-1414.

The first capturing sub-module 1411 activates the first camera 11 and the second camera 12 at the same time, and can capture a first photo using the first camera 11 and a second photo using the second camera 12. In one embodiment, a plurality of first photos and a plurality of second photos may be captured by different users.

The first analysis sub-module 1412 analyzes the second photo to extract characteristics of the second photo. In the embodiment, the second photo includes a facial portion of the user.

The extracted characteristics of the second photo can represent identification of the user. For example, the characteristics may include characteristics of the face shape, the skin color, and eyeballs of the facial portion of the user. The extracted characteristics are encoded into digital codes, such as binary codes.

The attribution edition sub-module 1413 adds the extracted characteristics of the second photo to the attribute information of the first photo. In the embodiment, the first photo may be an exchangeable image file format (EXIF) image. The extracted characteristics are inserted into a header of the EXIF information of the first photo.

The storing sub-module 1414 stores the first photo and its attribute information with the added characteristics into the storage 13. In one embodiment, the storing sub-module 1414 further deletes the second photo from the electronic device 10 after the characteristics are added into the attribute information of the first photo.

The browsing module 143 provides a photo browsing function to the user. Details of the browsing module 143 are included in the following descriptions of the sub-modules 1435-1439.

The second capturing sub-module 1435 captures a third photo of a target user using the second camera 12 when the target user activates the photo browsing function to browse the photos captured by himself/herself. The third photo includes the same facial portion of the target user that was captured in the second photo.

The second analysis sub-module 1436 analyzes the third photo to extract characteristics of the third photo. The characteristics of the third photo are extracted using the same method as the second photo.

The determining sub-module 1437 determines whether there are one or more first photos captured by the target user. In one example, the determining sub-module 1437 compares the characteristics of the third photo with the attribute information of the first photo, and determines whether the characteristics of the third photo match the characteristics of the second photo as included in the attribute information of the first photo. If the characteristics of the third photo match the characteristics of the second photo included in the attribute information carried by the first photo, the first photo is captured by the target user. Otherwise, the first photo is not captured by the target user.

The first process sub-module 1438 displays each first photo which is determined to be captured by the target user on the display screen 16. In one embodiment, the first process sub-module 1438 further hides the first photos which are determined not to be captured by the target user on the display screen 16. In one embodiment, the first process sub-module 1438 first displays an icon of each first photo captured by the target user on the display screen 16, and then displays the first photo when the icon is selected or clicked.

The second process sub-module 1439 notifies the target user when there is no first photo is captured by the target user. The notification that is used to notify the target user may be an audible message or a text message.

Figure 3:
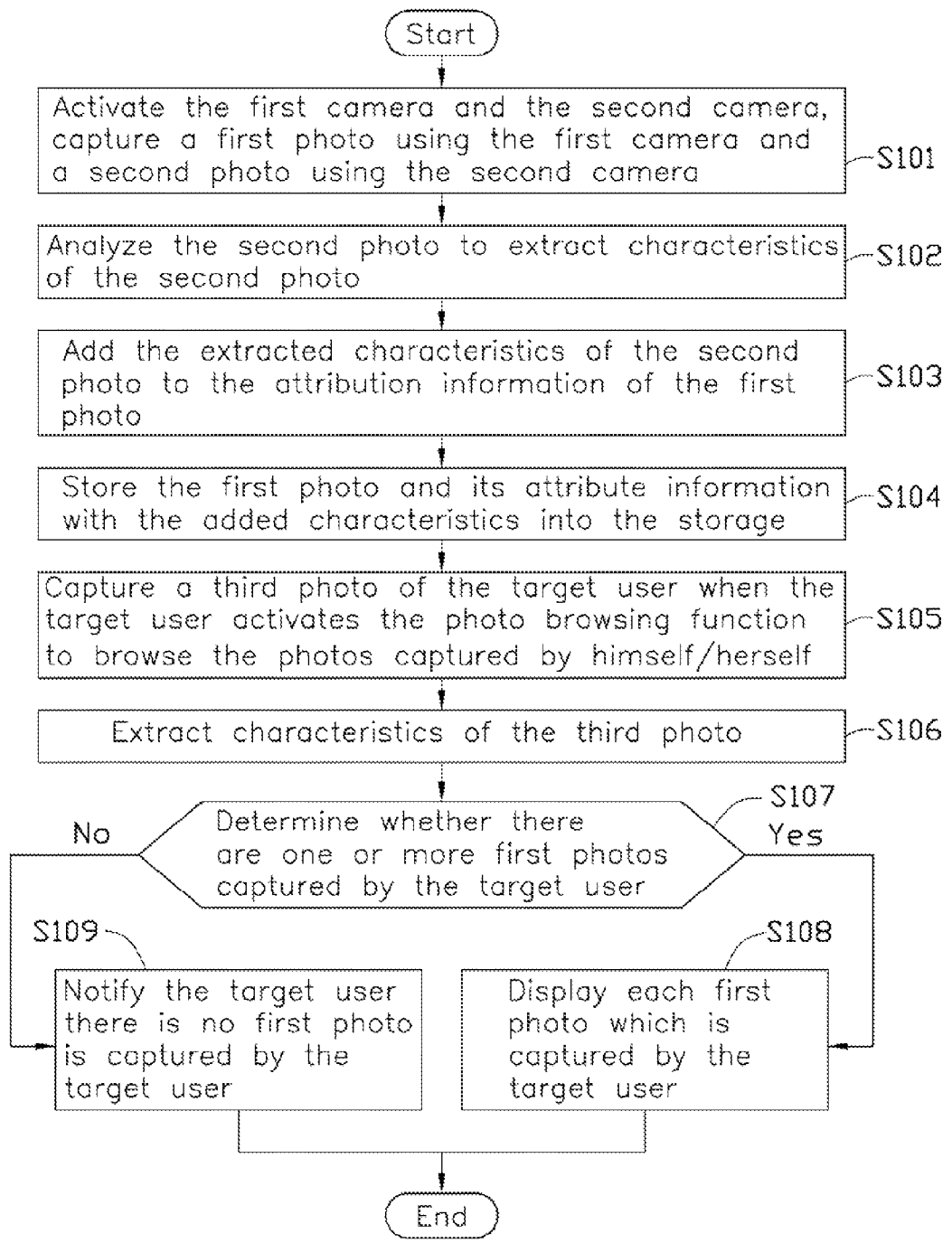
FIG. 3 is a flowchart of one embodiment of a photo management method of the electronic device of FIG. 1.

FIG. 3 is a flowchart of one embodiment of a photo management method of the electronic device 10 of FIG. 1. Depending on the embodiment, additional steps may be added, others removed, and ordering of the steps may be changed.

In step S101, the first capturing sub-module 1411 activates the first camera 11 and the second camera 12 at the same time, and captures a first photo using the first camera 11 and a second photo using the second camera 12.

In step S102, the first analysis sub-module 1412 analyzes the second photo to extract characteristics of the second photo.

In step S103, the attribution edition sub-module 1413 adds the extracted characteristics of the second photo to the attribute information of the first photo.

In step S104, the storing sub-module 1414 stores the first photo and its attribute information with the added characteristics, into the storage 13. In one embodiment, the storing sub-module 1414 further deletes the second photo from the electronic device 10 after the characteristics are added into the attribute information of the first photo.

In step S105, the second capturing sub-module 1435 captures a third photo of the target user when the target user activates the photo browsing function to browse the photos captured by himself/herself.

In step S106, the second analysis sub-module 1436 extracts characteristics of the third photo.

In step S107, the determining sub-module 1437 determines whether there are one or more first photos captured by the target user. If there are one or more first photos are captured by the target user, step S108 is implemented. Otherwise, if there is no first photo is captured by the target user, step S109 is implemented.

In step S108, the first process sub-module 1438 displays each first photo which is determined to be captured by the target user. In one embodiment, the first process sub-module 1438 further hides the first photos which are not captured by the target user.

In step S109, the second process sub-module 1439 notifies the target user when there is no first photo is captured by the target user. The notification that is used to notify the target user may be audible or visual such as a text message.

Figure 4:
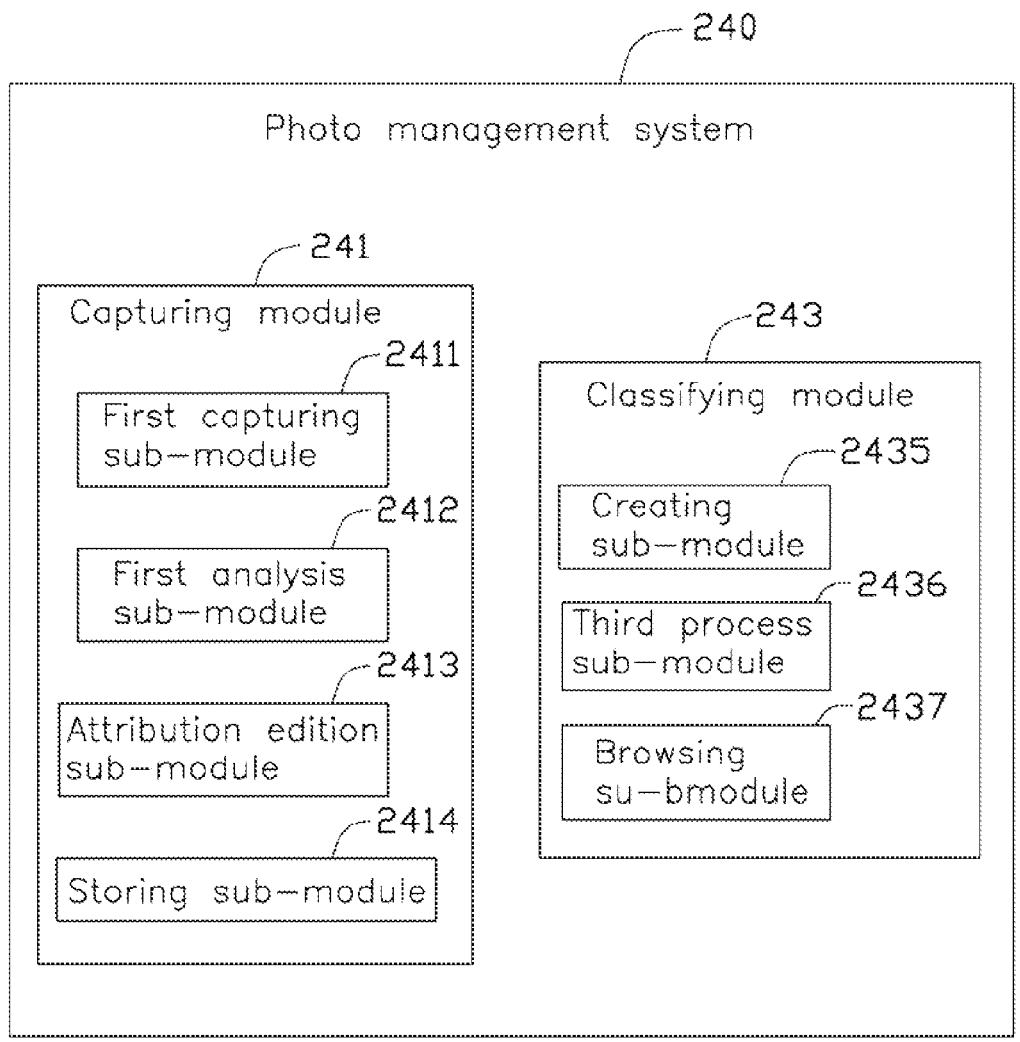
FIG. 4 is a schematic block diagram of another embodiment of the processor of the electronic device of FIG. 1.

FIG. 4 is a schematic block diagram of another embodiment of the processor of the electronic device 10 of FIG. 1.

In the embodiment, the photo management system 240 includes a capturing module 241 and a classifying module 243. The capturing module 241 has the same function as the capturing module 141. In detail, the capturing module 241 includes a first capturing sub-module 2411, a first analysis sub-module 2412, an attribution edition sub-module 2413, and a storing sub-module 2414. The first capturing sub-module 2411, the first analysis sub-module 2412, the attribution edition sub-module 2413, and the storing sub-module 2414 have the same or a corresponding function as the first capturing sub-module 1411, the first analysis sub-module 1412, the attribution edition sub-module 1413, and the storing sub-module 1414 respectively.

The classifying module 243 classifies all first photos captured by different users and then provides the browsing function of the photos to the target user when a target user wants to view the photos captured by the target user. The classifying module 243 includes a creating sub-module 2435, a third process sub-module 2436 and a browsing sub-module 2437. Details of the classifying module 243 are included in the following descriptions of the sub-modules 2435-2437.

The creating sub-module 2435 creates one or more folders to store the first photos captured by different users, each folder corresponding to a single user.

The third process sub-module 2436 stores each captured first photo into a corresponding folder according to the characteristics of the second photo of the user.

The browsing sub-module 2437 displays the one or more first photos in the folder corresponding to the target user when the electronic device 10 is operated by the target user to browse the first photos captured by the target user.

Figure 5:
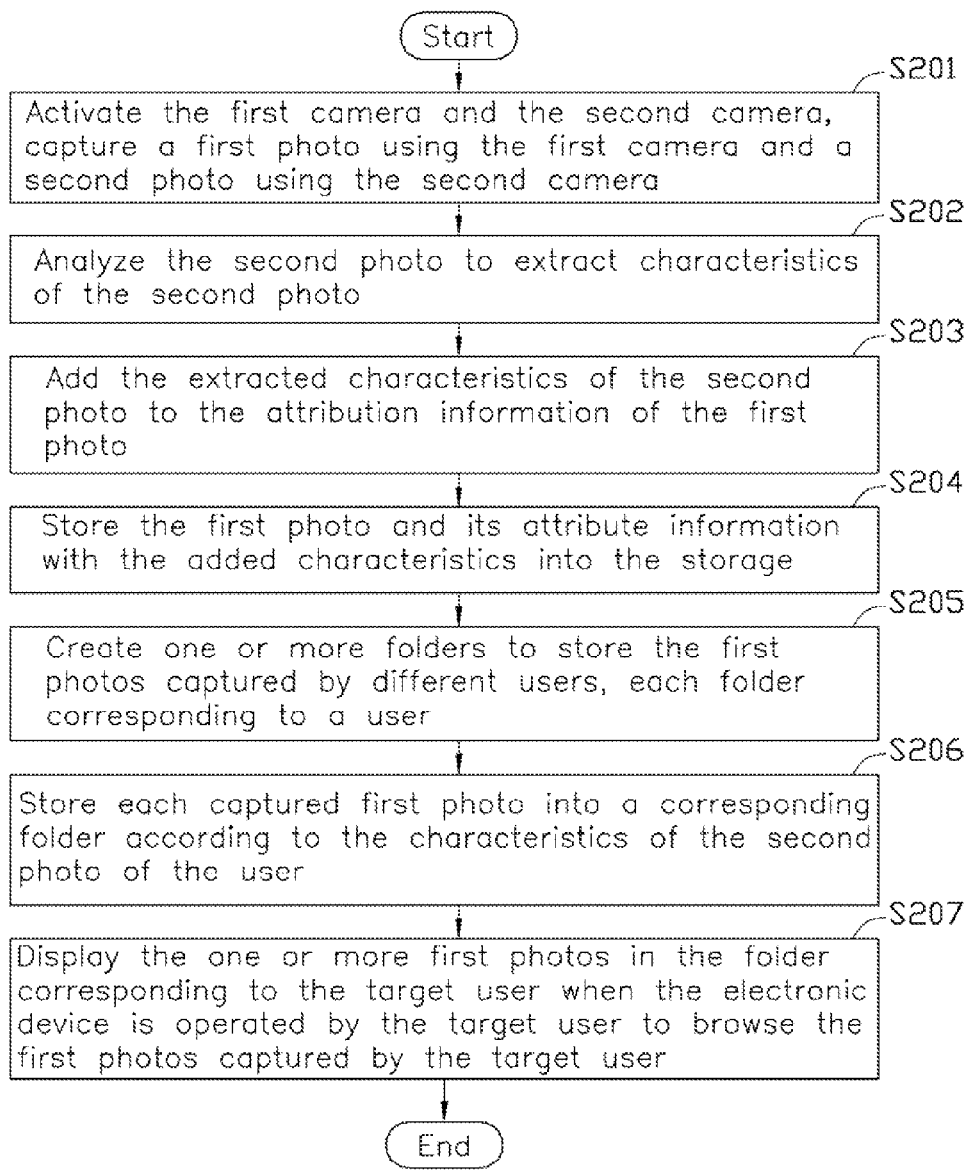
FIG. 5 is a flowchart of another embodiment of the photo management method of the electronic device of FIG. 1.

FIG. 5 is a flowchart of another embodiment of the photo management method of the electronic device 10 of FIG. 1. The photo management method includes steps S201-S208. The steps S201-S204 are similar to the steps S101-S104 correspondingly.

In step S205, the creating sub-module 2435 creates one or more folders to store the first photos captured by different users, each folder corresponding to a particular user.

In step S206, the third process sub-module 2436 stores each captured first photo into a corresponding folder according to the characteristics of the second photo of the user.

In step S207, the browsing sub-module 2437 displays the one or more first photos in the folder corresponding to the target user when the electronic device 10 is operated by the target user to browse the photos captured by the target user.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A photo management method using an electronic device comprising a first camera and a second camera, the photo management method comprising:
    activating the first camera and the second camera at the same time, and capturing one or more first photos using the first camera and a second photo using the second camera, the second photo comprising a facial portion of a user;
    extracting characteristics of the second photo;
    adding the extracted characteristics of the second photo to attribute information of the one or more first photos;
    storing the one or more first photos and the attribute information with the added characteristics into a storage of the electronic device;
    capturing a third photo of a target user using the second camera when the target user activates a photo browsing function of the electronic device to browse the one or more first photos captured by the target user, the third photo including a facial portion of the target user;
    extracting characteristics of the third photo;
    determining whether there are one or more first photos stored in the storage captured by the target user according to the extracted characteristics of the third photo; and
    displaying, on a display screen, the one or more first photos which are determined to be captured by the target user.

2. The photo management method according to claim 1, further comprising:
    hiding, on the display screen, the one or more first photos which are determined not to be captured by the target user.

3. The photo management method according to claim 1, further comprising:
    notifying the target user when there is no one or more first photos captured by the target user.

4. The photo management method according to claim 1, wherein the characteristics of the second photo and the third photo are facial characteristics.

5. The photo management method according to claim 1, wherein the one or more first photos is an exchangeable file format (EXIF) image, the extracted characteristics of the second photo are inserted into a header of the EXIF information of the one or more first photos.

6. The photo management method according to claim 1, further comprising:
    deleting the second photo from the electronic device after the characteristics are added to the attribute information of the one or more first photos.

7. The photo management method according to claim 1, wherein the determining whether there are one or more first photos stored in the storage captured by the target user comprises:
    comparing the characteristics of the third photo with the attribute information of the one or more first photos; and
    determining whether the characteristics of the third photo match the characteristics of the second photo comprised in the attribute information of the one or more first photos, wherein the one or more first photos is captured by the target user when the characteristics of the third photo match the characteristics of the second photo comprised in the attribute information of the one or more first photos.

8. The photo management method according to claim 1, wherein the displaying the one or more first photos which are determined to be captured by the target user comprises:
    displaying, on the display screen, an icon of each first photo captured by the target user, and displaying the one or more first photos when the icon is selected or clicked.

9. An electronic device, comprising:
    a first camera;
    a second camera;
    a display screen;
    a processor;
    a storage; and
    one or more programs stored in the storage and executed by the processor to
    activate the first camera and the second camera at the same time, and capturing one or more first photos using the first camera and a second photo using the second camera when the electronic device is operated to capture photos by a user, the second photo comprising a facial portion of the user;
    extract characteristics of the second photo;
    add the extracted characteristics of the second photo to attribute information of the one or more first photos;
    store the one or more first photos and the attribute information with the added characteristics into a storage of the electronic device;
    capture a third photo of a target user using the second camera when the target user activates a photo browsing function of the electronic device to browse the one or more first photos captured by the target user, the third photo including a facial portion of the target user;
    extract characteristics of the third photo;
    determine whether there is one or more first photos stored in the storage are captured by the target user according to the extracted characteristics of the third photo; and
    display, on a display screen, the one or more first photos which are determined to be captured by the target user.

10. The electronic device according to claim 9, wherein the processor
    hides, on the display screen, the one or more first photos which are determined not be captured by the target user.

11. The electronic device according to claim 9, wherein the processor notifies the target user when there is no one or more first photos is captured by the target user.

12. The electronic device according to claim 9, wherein the characteristics of the second photo and the third photo are facial characteristics.

13. The electronic device according to claim 9, wherein the one or more first photos is an exchangeable file format (EXIF) image, and the extracted characteristics of the second photo are inserted into a header of the EXIF information of the one or more first photos.

14. The electronic device according to claim 9, wherein the processor
    deletes the second photo from the electronic device after the characteristics are added to the attribute information of the one or more first photos.

15. The electronic device according to claim 9, wherein the processor
    compares the characteristics of the third photo with the attribute information of the one or more first photos; and
    determines whether the characteristics of the third photo match the characteristics of the second photo comprised in the attribute information of the one or more first photos, wherein the first photo is captured by the target user when the characteristics of the third photo match the characteristics of the second photo comprised in the attribute information of the one or more first photos.

16. The electronic device according to claim 9, wherein the processor displays, on the display screen, an icon of each first photo captured by the target user, and displays the one or more first photos when the icon is selected or clicked.

17. The electronic device according to claim 9, wherein the processor classifies the one or more first photos captured by different users according to the characteristics of different second photos.

18. The electronic device according to claim 17, wherein the processor creates one or more folders to store the one or more first photos captured by different users, each folder corresponding to a user;

stores each captured one or more first photos into a corresponding folder according to the characteristics of the second photo of the user; and displays, on the display screen, the one or more first photos in the folder corresponding to the target user when the electronic is operated by the target user to browse the one or more first photos captured by the target user.

\* \* \* \* \*